United States Patent [19]

Enninga

[11] Patent Number: 5,104,175
[45] Date of Patent: Apr. 14, 1992

[54] LIFT APPARATUS FOR ROTATABLE TRUCK BED COVER

[76] Inventor: Floyd L. Enninga, 12131 Dayton River Rd., Dayton, Minn. 55327

[21] Appl. No.: 711,467

[22] Filed: Jun. 5, 1991

[51] Int. Cl.$^5$ .............................................. B60P 7/02
[52] U.S. Cl. ...................................... 296/100; 296/156
[58] Field of Search ................ 296/100, 156; 220/334

[56] References Cited

U.S. PATENT DOCUMENTS

| | | | |
|---|---|---|---|
| 3,155,423 | 11/1964 | Cripe | 296/100 |
| 3,762,762 | 10/1973 | Beveridge et al. | 296/100 |
| 3,923,334 | 12/1975 | Key | 296/100 |
| 4,083,596 | 4/1978 | Robertson | 296/100 |
| 4,101,162 | 7/1978 | Koehn | 296/100 |
| 4,335,916 | 6/1982 | Gutgsell | 296/100 |
| 4,420,181 | 12/1982 | Hallburg | 296/100 |
| 4,756,571 | 7/1988 | Lake | 296/100 |

Primary Examiner—Robert R. Song
Attorney, Agent, or Firm—Warren A. Sturm

[57] ABSTRACT

An openable cover for a pickup truck body, or the like, that is rotatably operable about an internally mounted, stationary pivot means disposed adjacent the inside top, forward end of the cover so that the cover may be rotated about the pivot between open and closed positions with respect to the body through the use of suitable drive means disposed within and connected between the body and cover.

8 Claims, 2 Drawing Sheets

LIFT APPARATUS FOR ROTATABLE TRUCK BED COVER

BACKGROUND OF THE INVENTION

1. Field of the Invention

This invention relates generally to openable covers for truck bodies to protect materials or objects placed in the truck body during shipment, when closed, and to permit unlimited and free access to the interior of the truck body when in an open position. My invention is advantageous wherever the relative dimensions of the materials carried on or in a truck bed/body and the loading and unloading operation are such that it is inconvenient or impossible to gain access to the interior of a completely covered, closed truck body and cover assembly.

2. Description of the Prior Art

The prior art includes:

| Patent No. | Patentee | Issue Date |
|---|---|---|
| 2,769,658 | Edmonds, Sr. | November 6, 1956 |
| COMBINATION CONVERTIBLE TOP AND EXPANSIBLE VEHICLE BODY | | |
| 3,051,523 | Boyce-Smith et al. | August 28, 1962 |
| COUNTERBALANCED TRUCK BED LID | | |
| 3,155,423 | Cripe | November 3, 1964 |
| LIFTABLE VEHICLE TOP | | |
| 3,578,378 | Anderson | May 11, 1971 |
| TELESCOPIC AND PIVOTAL COVER ASSEMBLY FOR OPEN BED VEHICLES | | |
| 3,840,263 | Bowden | October 8, 1974 |
| PORTABLE SEAT FOR TRUCK BODIES | | |
| 3,913,969 | Hoch | October 21, 1975 |
| TRUCK BODY CLOSURE | | |
| 3,923,334 | Key | December 2, 1975 |
| VEHICLE BED COVER ASSEMBLY | | |
| 3,954,296 | Patnode | May 4, 1976 |
| COMBINED AUXILIARY CAB AND TONNEAU COVER FOR TRUCK | | |
| 4,083,596 | Robertson | April 11, 1978 |
| RAISABLE TOPPER | | |
| 4,101,162 | Koehn | July 18, 1978 |
| VERTICALLY SWINGABLE CAMPER SHELL | | |
| 4,277,098 | Gibney | July 7, 1981 |
| FOLDABLE TRUCK CAP ASSEMBLY | | |
| 4,335,916 | Gutgsell | June 22, 1982 |
| TRUCK BED CAP STRUCTURE | | |
| 4,420,181 | Hallburg | December 13, 1983 |
| BOAT-CANOPY FOR TRUCK BEDS | | |
| 4,498,601 | Hill et al. | January 15, 1985 |
| HIGH CAPACITY, SELF-UNLOADING FORAGE HOPPER | | |

Included in the known prior art of the patents listed above, are the Koehn U.S. Pat. No. 4,101,162 and the Hoch U.S. Pat. No. 3,913,969. These two patents represent similar attempts to provide an openable cover for a truck body which, when coupled with the various and sundry apparatus and devices for providing adjustably removable or openable covers for truck bodies and the like, are believed to merely serve to illustrate that numerous designs have been attempted to accomplish similar results in substantially different ways, all of which are either more complicated, remain exposed to the weather and possible resulting environmental damage and which may occupy excessive usable space within the volume enclosed by the truck body and cover. The Koehn patent is clearly illustrative of a highly complicated, unreliable apparatus, while the Hoch patent provides all of the operating mechanism exteriorly of the volume enclosed by the truck body and cover whereby the elements of the apparatus are exposed to environmental deterioration or damage.

SUMMARY OF THE PRESENT INVENTION

My invention provides for an interiorly disposed pivot apparatus which is mounted upon and extends upwardly from a truck body to provide a pivot axis adjacent the front top of a cover for the body which is, in turn, provided with interiorly-disposed lever means which may be engageable by a driving means to rotate a truck body cover about its forward upper interior portion. A driving means, such as an extendable linear actuator may be disposed between the lever means and the truck body to provide a controllable actuation of the cover about the pivot axis to close and open or permit egress to the interior of the truck body.

Another advantage of my invention is that the operative mechanism is disposed completely interiorly of a truck body and a cover assembly and may easily mounted thereupon without requiring

DETAILED DESCRIPTION OF THE INVENTION

Figure 1:
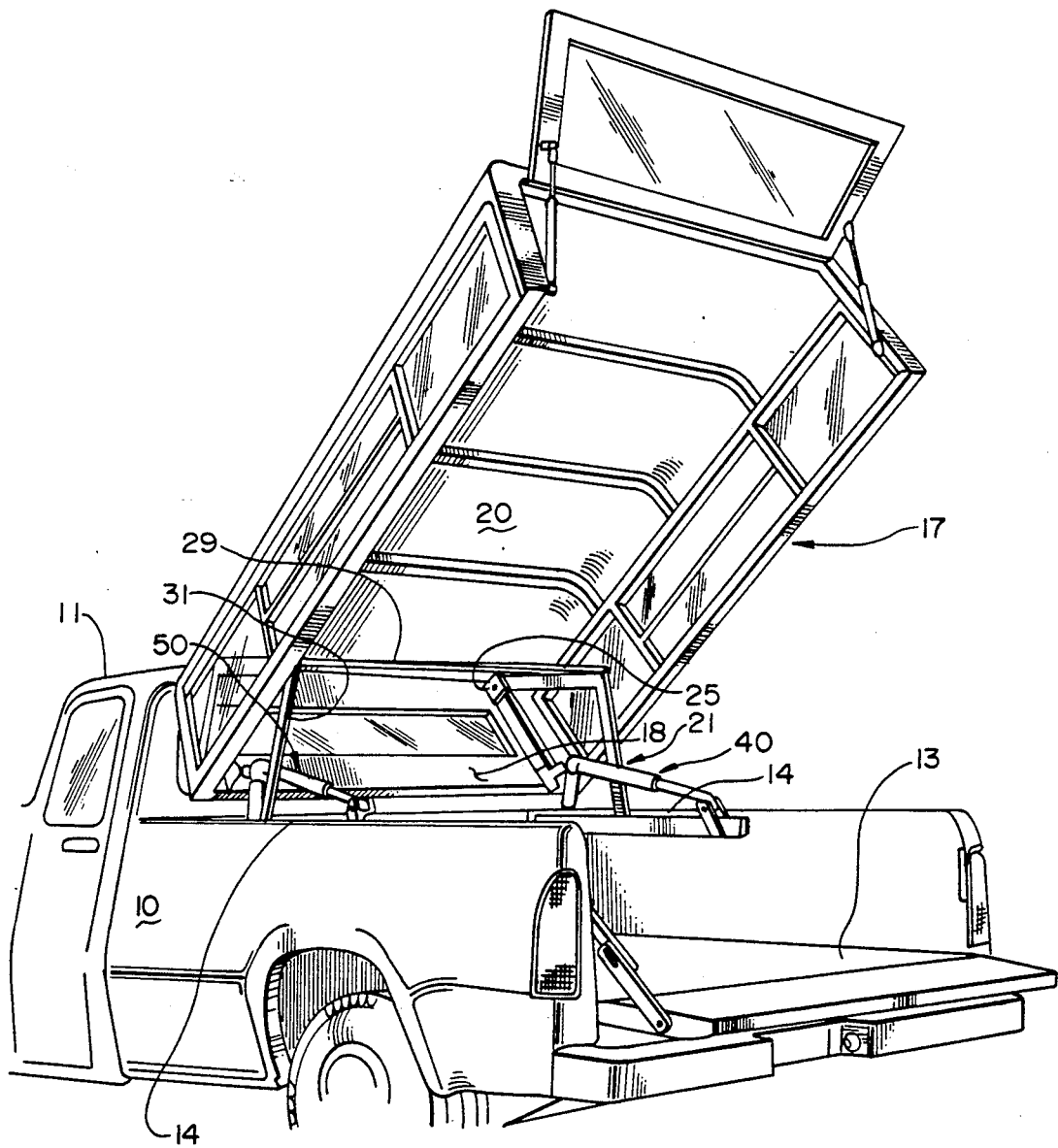
FIG. 1 is a rear perspective view of a pickup truck box body and a topper cover, having the invention installed therein and showing the topper cover in an open or up-tilted position.
Figure 2:
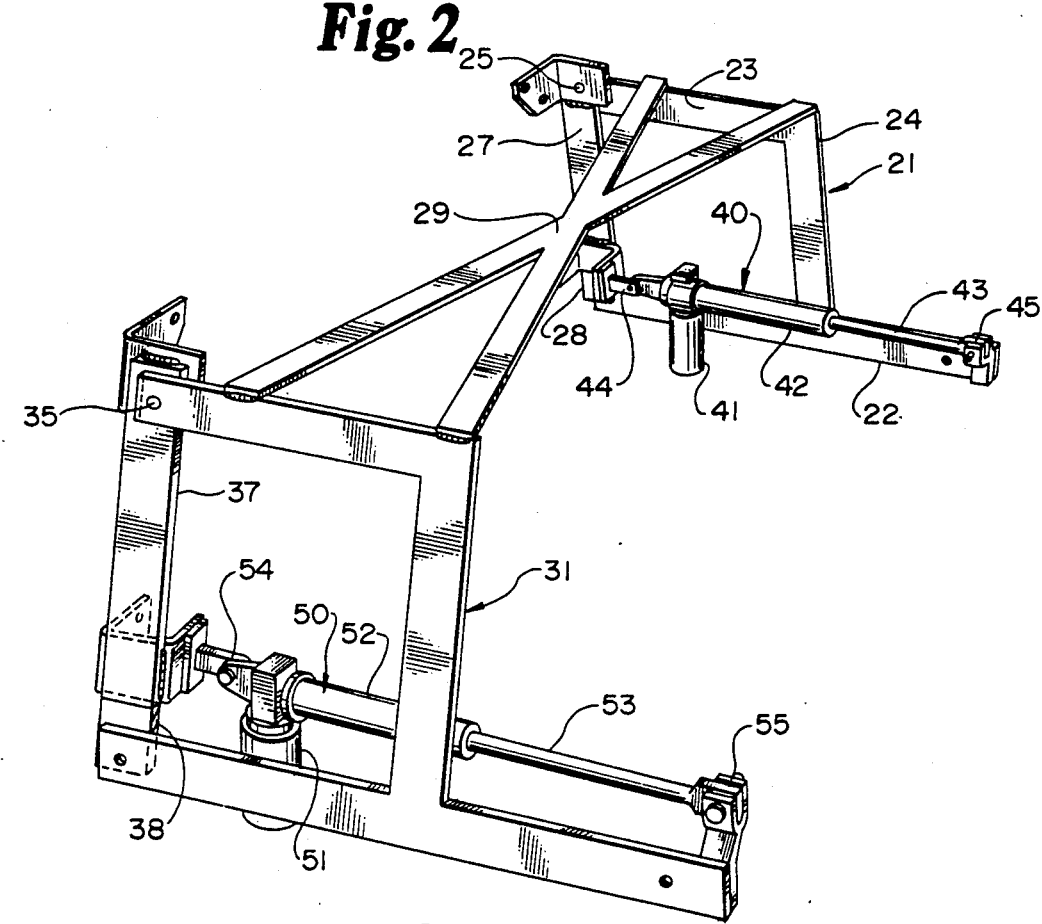
FIG. 2 is a perspective view of the operative apparatus of my invention in a closed relationship; and, FIG. 3 is a left side elevational view illustrating the relationship of the operative elements of my invention in an open position.
Figure 3:
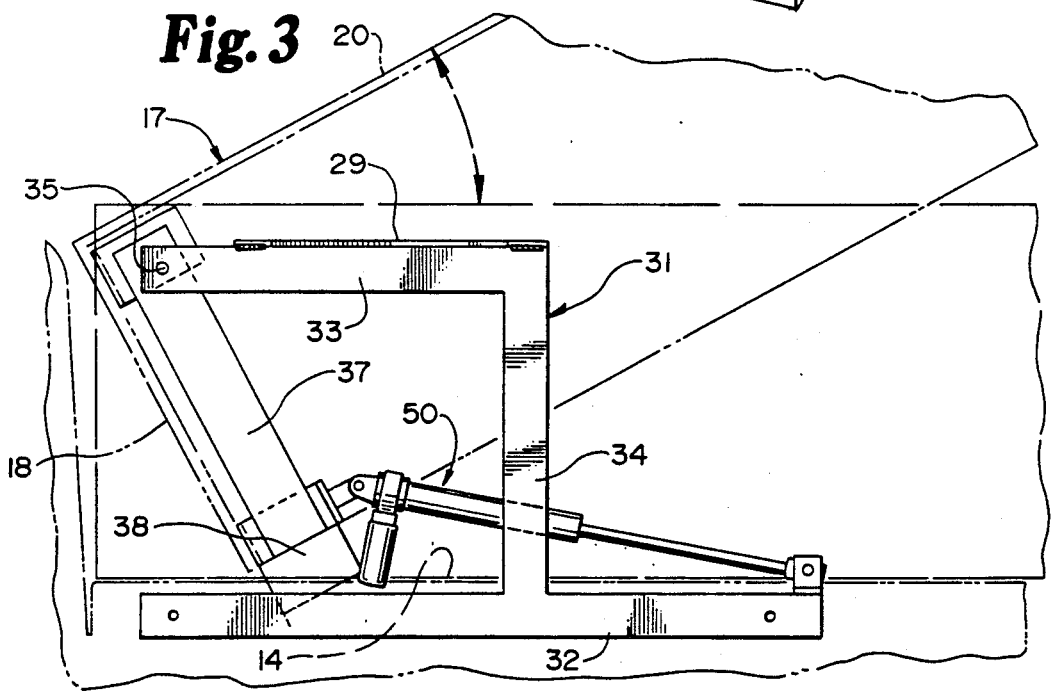

Referring to FIGS. 1, 2 and 3 of the drawings in which like elements have been identified with like reference characters, a pickup truck 10 is shown having a cab 11 and a body 12 having a bed 13 and upper front side portions indicated by reference character 14. A cover 17 is shown having a front portion 18 as well as a roof 20.

There are numerous examples of various combinations of pickup truck bodies and topper-covers and while the covers may be made of light-weight material and therefore easily removeable when free access to the interior of the truck body is sought or desired, it is a nuisance that need no longer be tolerated.

As will be understood from a consideration of the complete disclosure of the illustrated embodiment of my invention, cover 17 is rendered rotatable about a pivot axis disposed adjacent its forward top inside portion and parallel to the top rear portion of the cab 11 of pickup truck 10. This is accomplished by providing right and left base members 21 and 31, having pivots 25 and 35 respectively.

Right base 21 is provided with a longitudinally extending bottom portion 22 and a top portion 23 that is supported by standard 24 extending intermediate top and bottom portions 22 and 23. Similarly, left base 31 is shown as having a bottom portion 32 and a top portion 33 that are interconnected by standard 34. The bottom portions 22 and 32 are intended to be rigidly connected to the upper forward side portions of the pickup body 12 and, to render the assembly rigid, a bridge 29 may be suitably attached, as by welding, across the top of top members 23 and 33 so that, as may be seen in FIG. 2, pivots 25 and 35 are disposed coaxially to define a pivot axis for the upper forward end of cover 17.

Right and left operating lever members 27 and 37 having downwardly depending guides 28 and 38, are pivotally disposed on pivots 25 and 35 and are suitably attached to the front end 18 of cover 17 by suitable fastening means and additional elements (not shown) may be added, as necessary, to rigidly interconnect connect levers 27 and 37 to properly drive cover 17 to cause rotation about the axis defined by pivots 25 and 35 and thereby provide a connection to right and left actuators 40 and 50 containing motors 41 and 51, cylinders/drives 42 and 52, rams 43 and 53, front pivot 44 and 54 and rear pivots 45 and 55, respectively.

While actuators 40 and 50 may be recognized as electric motor driven screw actuator devices which extend and retract rams 43 and 53, various other forms of appropriate drive mechanisms, hydraulic, pneumatic, mechanical or the like may occur to those skilled in the art. Similarly, the shape and configuration of base members 21 and 31 and lever members 27 and 37 may be suitably modified to permit the use of other mechanisms or geographical configurations while maintaining the existence of a stationary pivotal axis at the upper front inside portion of a cover, such as illustrated by reference character 17.

Operation of the Illustrated Embodiment

Referring to FIGS. 2 and 3 of the drawings, it may now be clear to those skilled in the art that the geometries and construction provide for rotation of cover 17 about a pivoting axis defined by pivots 25 and 35 may easily be obtained by suitable, preferably simultaneous, actuation of actuators 40 and 50 to cause levers 27 and 37 to rotate and thereby rotate front 18 and the remainder of cover 17 about the pivoting axis. With the electro-mechanical actuators shown, motors 41 and 51 may easily be comprised of electric motors with which, in turn, cause reciprocation of rams 43 and 53 to effect the desired opening and closing of cover 17.

I claim:

1. In apparatus of the class above described having an upwardly opening body and a downwardly opening cover therefor; the combination comprising:

pivot means, disposed to extend upwardly from the forward portion of a pickup body and adjacent the interior forward end of and spaced above the lower edge of a pickup body cover, extending upwardly from the forward portion of a pickup body to define a stationary pivot axis extending transversely of and vertically spaced above the top edge of the pickup body side walls;

lever means stationarily mounted on the front inside portion of said pickup body cover, the top of said lever means being pivotally connected to said pivot means for rotation thereabout; and drive means connected between said lever means and said pickup body and operable to rotate said cover about said pivot means between upwardly extending open and lowered closed positions with respect to said pickup body.

2. The apparatus of claim 1 in which the drive means ar telescoping and disposed intermediate the other end of the lever means and the pickup body.

3. The apparatus of claim 2 in which the drive means are comprised of hydraulic pistons and cylinders.

4. The apparatus of claim 2 in which the drive means are comprised of screw threaded shafts operable in response to rotary electrical drive means.

5. The apparatus of claim 1 in which the pivot means are disposed on the top of a pair of vertically extending side members extending upwardly from the top edge of each of the pickup side walls.

6. The apparatus of claim 5 in which the top edges of the side frame members are interconnected by a rigid frame member.

7. The apparatus of claim 5 in which the drive means are telescoping and disposed intermediate the other ends of the lever means and the rear ends of the side frame members.

8. The apparatus of claim 6 in which the drive means are longitudinally extendable and are disposed intermediate the other ends of the lever means and the rear ends of the side frames.

* * * * *